H. F. CARTWRIGHT.
SUPPORTING FRAME FOR MOTOR TRUCKS.
APPLICATION FILED OCT. 6, 1917.
1,306,685.
Patented June 17, 1919.
2 SHEETS—SHEET 1.
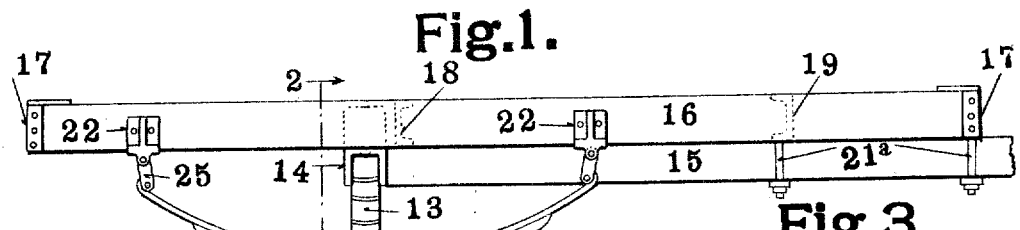
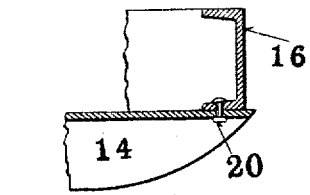
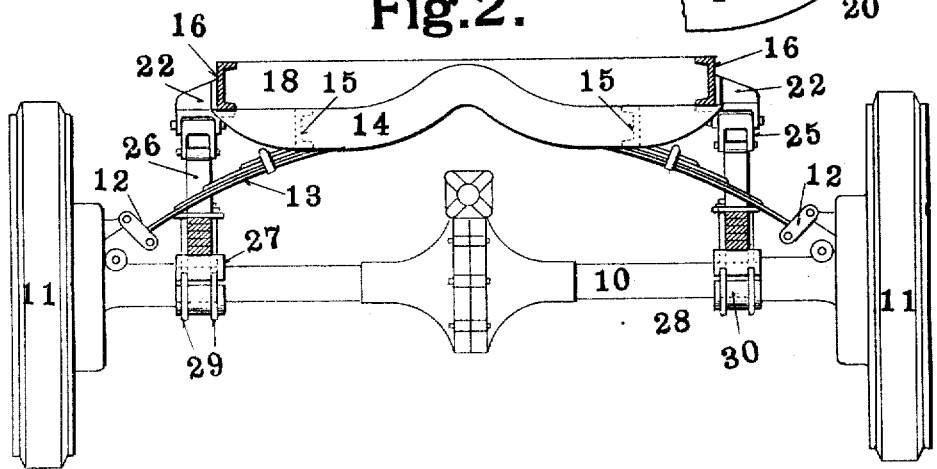
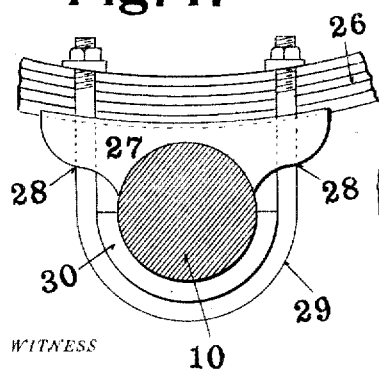
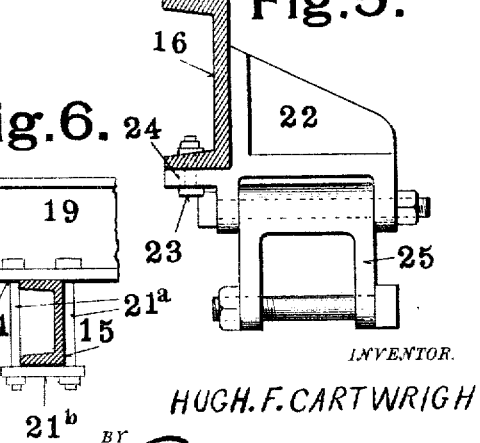
WITNESS
W. H. Alexander.
INVENTOR.
HUGH. F. CARTWRIGHT.
BY
E. E. Haffman
ATTORNEY.

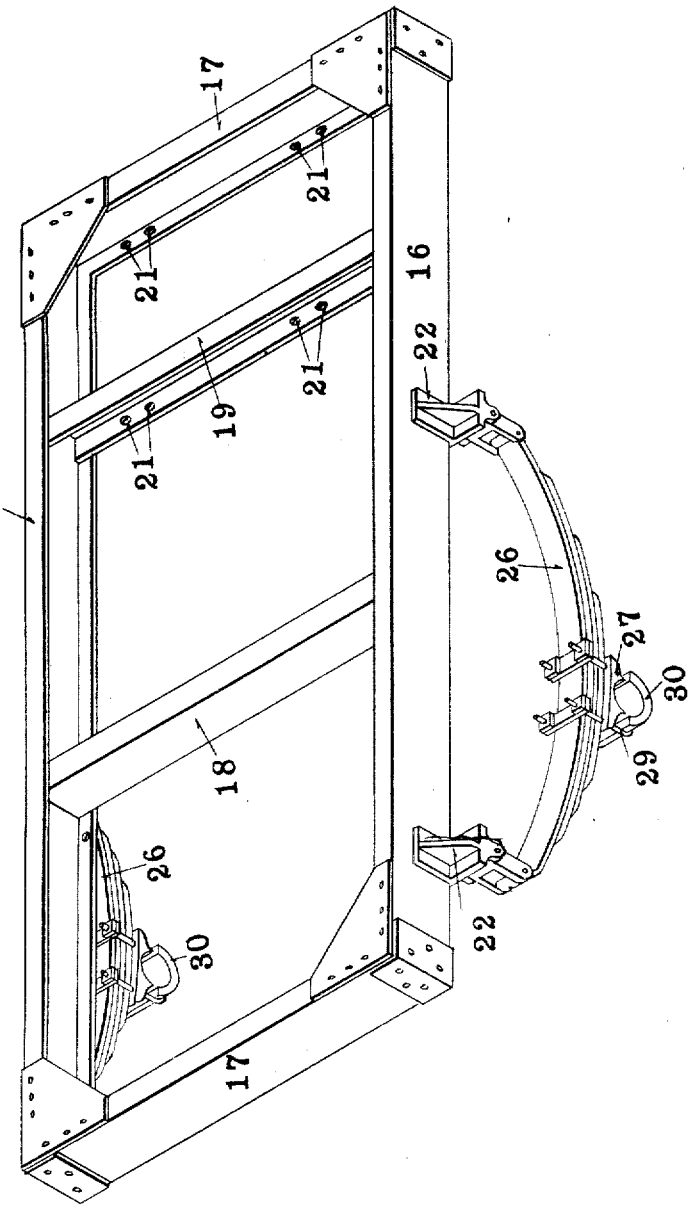

UNITED STATES PATENT OFFICE.

HUGH F. CARTWRIGHT, OF ST. LOUIS, MISSOURI.

SUPPORTING-FRAME FOR MOTOR-TRUCKS.

1,306,685.  Specification of Letters Patent.  Patented June 17, 1919.

Application filed October 6, 1917. Serial No. 195,021.

*To all whom it may concern:*

Be it known that I, HUGH F. CARTWRIGHT, a citizen of the United States of America, residing at the city of St. Louis, State of Missouri, United States of America, have invented a certain new and useful Supporting-Frame for Motor-Trucks, of which the following is such a full, clear, and exact description as will enable anyone skilled in the art to which it appertains to make and use the same, reference being had to the accompanying drawings, forming part of this specification.

My invention relates to an extension device for motor truck frames, whereby they may accommodate a larger body and is particularly applicable to trucks of the Ford type. One object of my invention is to provide a device of the kind indicated which may be attached to a Ford truck of standard construction without the necessity of boring any holes or making any change in its construction. Other objects and advantages will appear from the following more detailed description.

In the accompanying drawings, which illustrate one form of truck made in accordance with my invention, Figure 1 is a side view; Fig. 2 a section taken on the line 2—2 of Fig. 1; Fig. 3 is an enlarged sectional view showing the manner of securing the auxiliary frame to the spring-housing; Fig. 4 is an enlarged view showing the manner of securing the auxiliary springs to the rear axle; Fig. 5 is an enlarged view, showing the manner of securing the auxiliary springs to the auxiliary frame; Fig. 6 is a sectional view showing the manner of securing the auxiliary frame to the main frame; Fig. 7 is a perspective view showing the extension device detached from the main truck.

Like marks of reference refer to similar parts in the several views of the drawings.

10 is the rear axle carried by the rear wheels 11. Supported from the rear axle by means of toggles 12 is the rear spring 13, secured to the spring-housing 14. Carried by this spring-housing 14 are a pair of side pieces 15 forming the main frame of the truck. All of these parts are of the usual well-known Ford type.

In order to provide for the employment of a body longer than would be accommodated by the regular Ford truck frame, I provide an auxiliary frame, consisting of side pieces 16, ends 17, and cross-pieces 18 and 19 respectively, and springs 26. The side pieces 16 are arranged such a distance apart as to be attached to the ends of the spring-housing 14. This is accomplished by means of bolts or rivets 20 passing down through openings in the side pieces 16 of the extension frame, and openings in the ends of the spring-housing 14. It will be unnecessary to form openings in the ends of the spring-housing 14, as such openings are formed therein by the manufacturers. In order to provide additional means for securing the extension frame to the main frame of the truck, I provide in the cross-piece 19, and also preferably in the forward end 17 of the extension frame, openings 21, which openings are arranged in pairs (best shown in Fig. 7 of the drawings) in such position that the bolts 21ª passing down through said openings will pass at each side of the bars 15 of the main truck frame, as best shown in Fig. 6 of the drawings. These bolts 21ª serve to hold against the lower edge of the bars 15 cross pieces or clips 21ᵇ, whereby the extension frame is securely fastened to the main frame without drilling or otherwise operating upon the main frame. In order to form additional spring supports for the auxiliary frame, I secure to the side pieces 16 thereof, brackets 22, shown in detail in Fig. 5 of the drawings. These brackets 22 are secured in position by means of rivets or bolts 23 passing through a flange 24 on said brackets and the lower horizontal flange of the side piece 16. Pivoted in the brackets 22 are toggles 25 to which are attached the ends of the auxiliary or side springs 26. These auxiliary or side springs 26 are secured to the axle 10, as shown in Fig. 4 of the drawings. A shoe is arranged, having a concave lower face adapted to fit substantially half way around the axle 10, and having the upper face conforming to the curvature of the central part of the spring 26. Formed in this shoe 27 are holes 28, through which pass a pair of U-bolts 29. These U-bolts 29 must be sufficiently far apart to allow of the passage of the ends of the main spring 13 between them. This is secured by the proper positioning of the holes 28. In order to allow the central part of the U-bolts to grip the axle 10, I provide a filling piece 30, so as to cause the curvature of the central part of the bolts to be sufficient to bring the ends of the bolt in alinement with the holes 28.

It will be seen that the auxiliary frame can be attached to the main frame of a truck of the Ford type without any alteration in the said truck, by means of the bolts or rivets 20 and the fastening device consisting of the bolts 21ª, and cross-piece or clips 21ᵇ. As has been pointed out, the necessary openings are formed in the spring-housing 14 by the manufacturers. The use of the auxiliary springs not only enables the truck to carry a greater load, but also prevents undue lateral rocking movement of the truck body, such as would occur in a heavier truck body if these auxiliary springs were not used.

Having fully described my invention, what I claim as new and desire to secure by Letters Patent of the United States is:

1. The combination with the main frame, rear axle and spring housing of a motor vehicle, said spring housing extending across the main frame and being provided with a spring attached to the rear axle, of an extension device comprising an auxiliary frame resting on said main frame and in projection from the rear thereof, a pair of auxiliary springs carried by said auxiliary frame, and means for securing said auxiliary spring directly to the rear axle, said auxiliary springs extending between the axle and the first named spring.

2. The combination with the side pieces, spring housing, and rear axle of a chassis, said spring housing extending across the side pieces and being provided with a spring attached to the rear axle, of an extension device comprising an auxiliary frame of greater width than the distance between the side pieces of the chassis, means for securing said frame to the side pieces and spring housing of the chassis, auxiliary springs carried by said auxiliary frame, and fastening means passing around the axle for securing said auxiliary frame thereto, whereby said extension device is secured in position without altering the chassis.

3. The combination with the side pieces and spring housing of a chassis, said spring housing extending across the side pieces and being provided with a spring attached to the rear axle, of an extension device comprising an auxiliary frame composed of side pieces and cross pieces, said auxiliary frame being of greater width than the distance between the side pieces of the chassis, loops carried by said cross pieces, and passing around the side pieces of the chassis, and fastening means carried by the side pieces of the auxiliary frame and engaging with the openings in the ends of the spring housing.

4. The combination with the side pieces, spring housing and rear axle of a chassis, said spring housing extending across the side pieces and being provided with a spring attached to the rear axle, of an extension device comprising an auxiliary frame composed of side pieces and cross pieces, said auxiliary frame being of greater width than the distance between the side pieces of the chassis, loops carried by said cross pieces and passing around the side pieces of the chassis, fastening means carried by the side pieces of the auxiliary frame and engaging with the openings in the ends of the spring housing, auxiliary springs carried by the side pieces of the said auxiliary frame, and means for securing said auxiliary springs directly to the rear axle.

In testimony whereof, I have hereunto set my hand and affixed my seal.

HUGH F. CARTWRIGHT. [L. S.]

Copies of this patent may be obtained for five cents each, by addressing the "Commissioner of Patents, Washington, D. C."